(12) United States Patent
Aldrich et al.

(10) Patent No.: US 9,413,877 B2
(45) Date of Patent: Aug. 9, 2016

(54) METHOD AND SYSTEM FOR AUTOMATIC CALL TRACKING AND ANALYSIS

(75) Inventors: Grant Aldrich, Thousand Oaks, CA (US); Jasson Gilmore, Aliso Viejo, CA (US)

(73) Assignee: Elysium Publishing, Inc., Las Vegas, NV (US)

( * ) Notice: Subject to any disclaimer, the term of this patent is extended or adjusted under 35 U.S.C. 154(b) by 23 days.

(21) Appl. No.: 12/750,523

(22) Filed: Mar. 30, 2010

(65) Prior Publication Data

US 2011/0243311 A1    Oct. 6, 2011

(51) Int. Cl.
| | |
|---|---|
| *H04M 11/00* | (2006.01) |
| *H04M 3/22* | (2006.01) |
| *G10L 15/26* | (2006.01) |
| *H04M 3/42* | (2006.01) |
| *H04M 3/51* | (2006.01) |

(52) U.S. Cl.
CPC ............. *H04M 3/2281* (2013.01); *G10L 15/26* (2013.01); *H04M 3/42221* (2013.01); *H04M 3/51* (2013.01)

(58) Field of Classification Search
CPC .................... H04M 2201/405; H04M 2201/41
USPC ........... 379/88.14, 265.03, 93.01; 704/7, 277, 704/251
See application file for complete search history.

(56) References Cited

U.S. PATENT DOCUMENTS

| | | | | |
|---|---|---|---|---|
| 6,724,887 B1* | 4/2004 | Eilbacher | ............ | H04M 3/5183 379/265.02 |
| 7,058,565 B2* | 6/2006 | Gusler | ..................... | G10L 15/26 379/88.01 |
| 7,672,845 B2* | 3/2010 | Beranek | .................... | 379/265.09 |
| 2004/0002868 A1* | 1/2004 | Geppert | ................ | H04M 15/00 704/277 |
| 2008/0101565 A1* | 5/2008 | Tyler | ...................... | H04M 11/10 379/93.01 |

OTHER PUBLICATIONS

Yext Company, http://www.yext.com/company.jsp (last visited Aug. 20, 2010).
U.S. Appl. No. 12/368,155—Mar. 31, 2011 PTO Office Action.

\* cited by examiner

*Primary Examiner* — Van D Huynh
(74) *Attorney, Agent, or Firm* — Davidson Berquist Jackson & Gowdey LLP

(57) ABSTRACT

Methods and systems for automatic phone call tracking and analysis of the content and outcomes of a call are provided. These systems may provide businesses with the ability to track and view analytics of the number and various outcomes of calls, thereby providing up-to-date real-time analysis of the automatically-generated results of client interactions with staff answering the phones. Methods and systems in accordance with the present invention quantitatively and objectively analyze staff performance and marketing return on investment (ROI), and track patient demand across various procedures. This may automatically provide information on the number of calls with various outcomes, e.g., the customer booked an appointment, the customer hung up while on hold, the customer was connected with voicemail, the customer left a message on voicemail, the customer is an existing client, etc. Other automatically-detected aspects of phone call contents are provided.

35 Claims, 11 Drawing Sheets

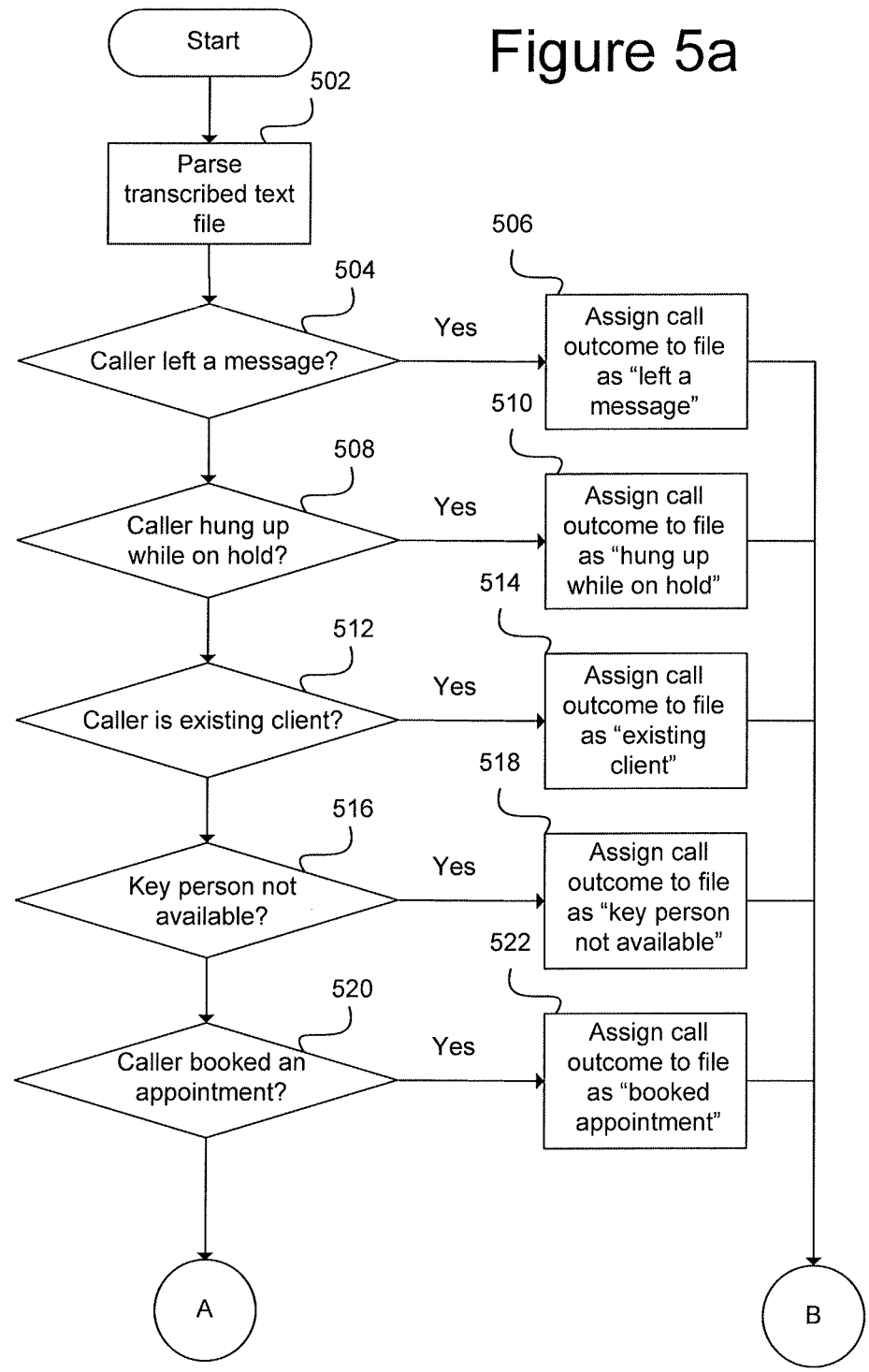

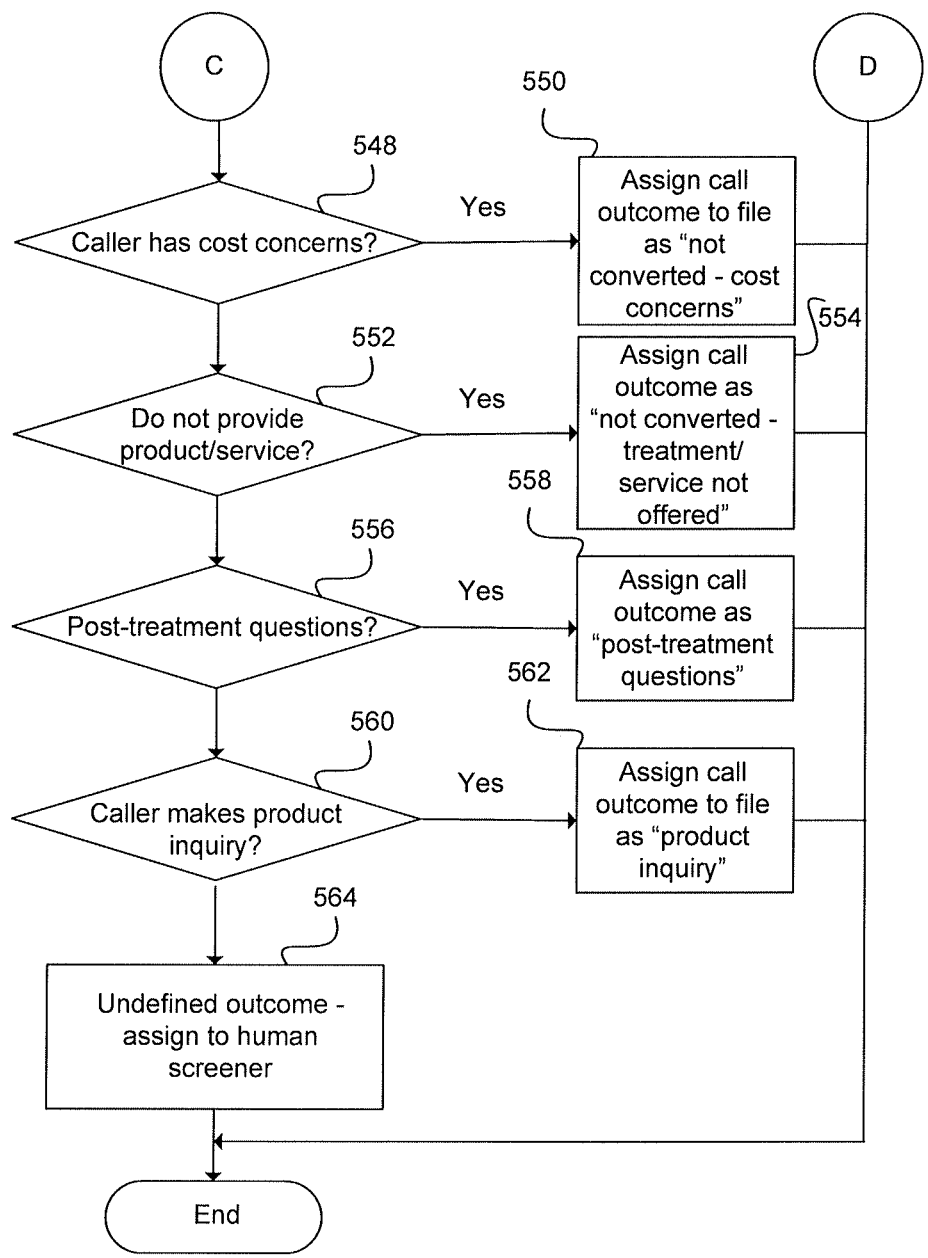

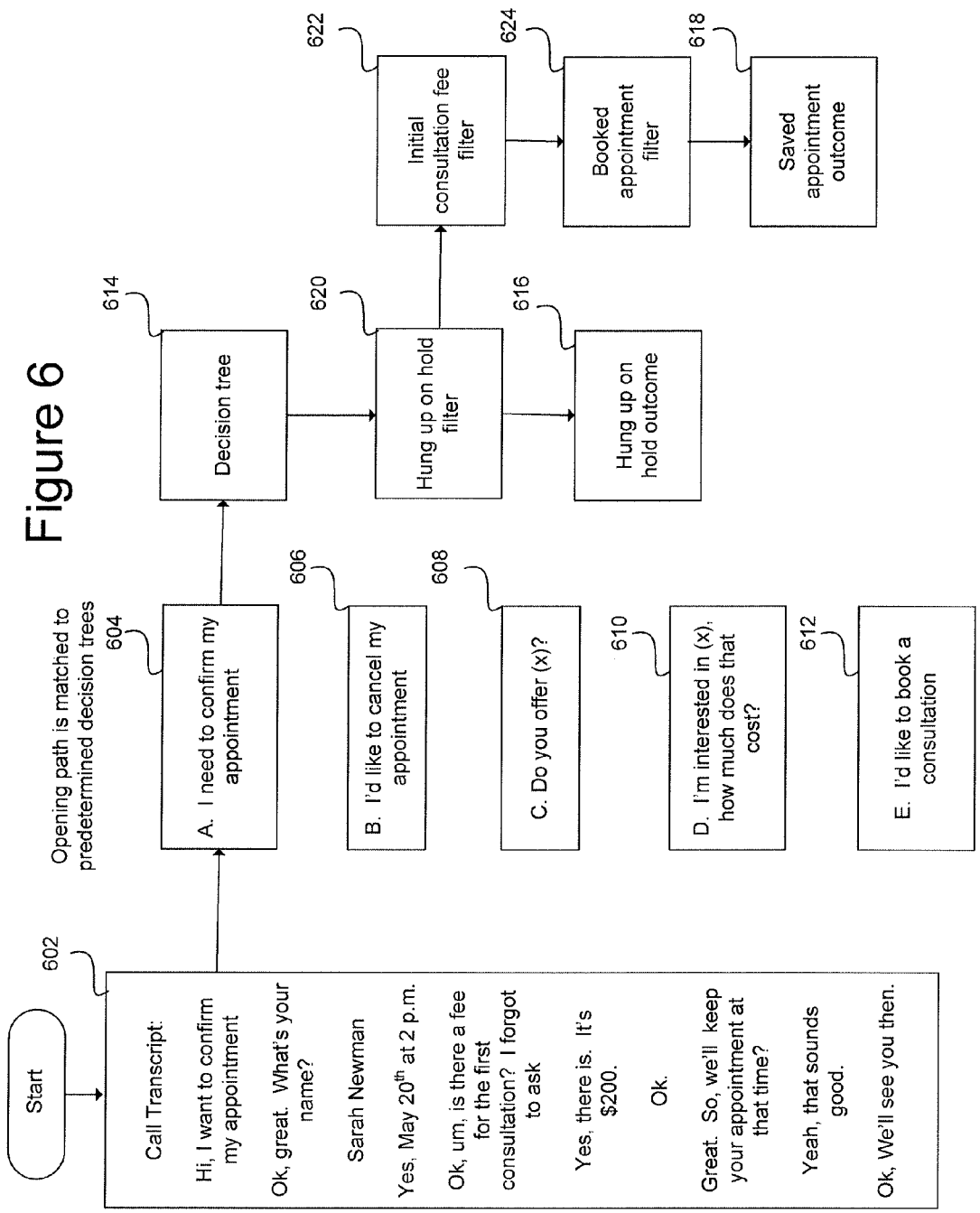

Figure 9

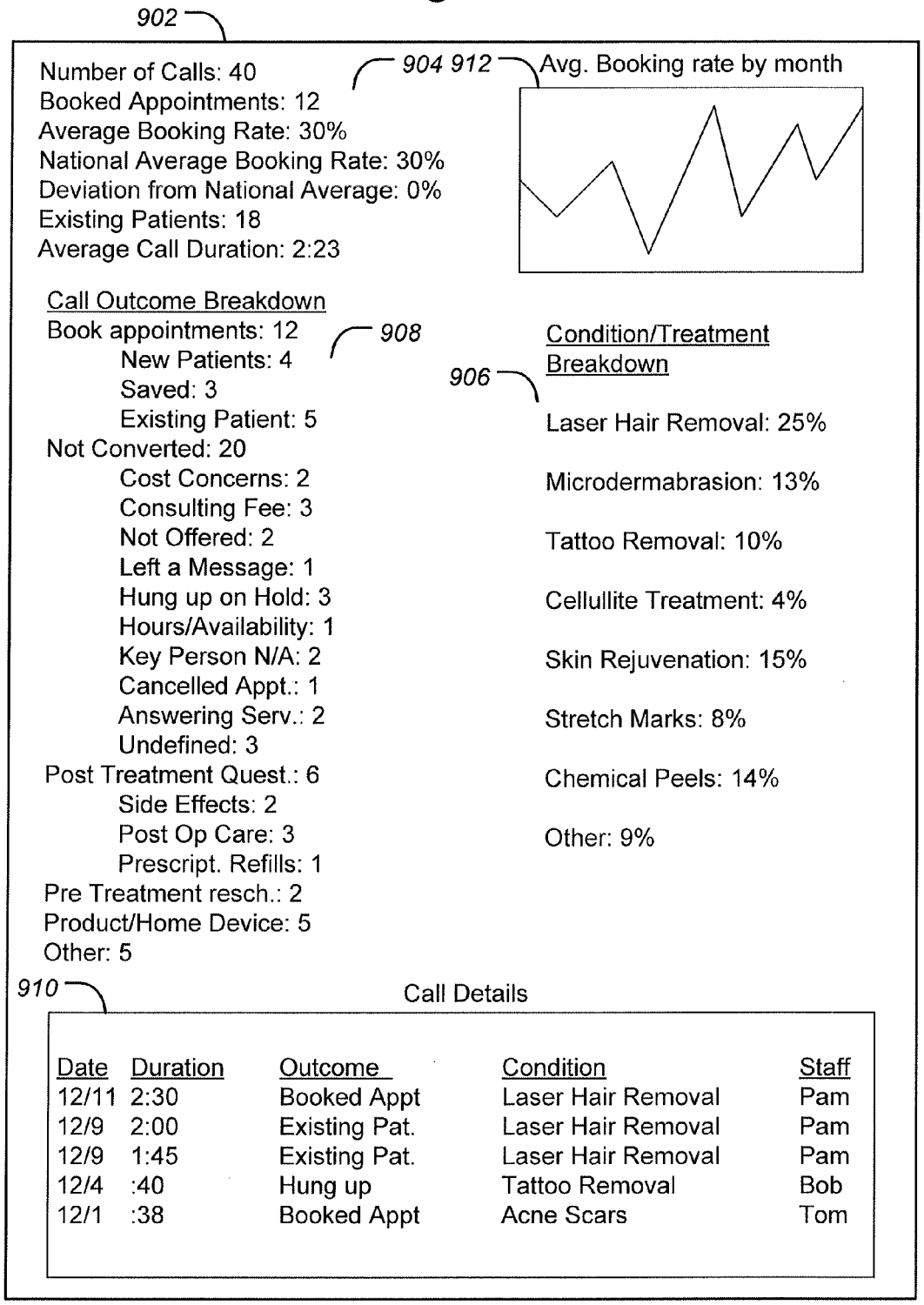

902 —

Number of Calls: 40
Booked Appointments: 12
Average Booking Rate: 30%
National Average Booking Rate: 30%
Deviation from National Average: 0%
Existing Patients: 18
Average Call Duration: 2:23

904  912 — Avg. Booking rate by month

Call Outcome Breakdown
Book appointments: 12     — 908
   New Patients: 4
   Saved: 3               906 —
   Existing Patient: 5
Not Converted: 20
   Cost Concerns: 2
   Consulting Fee: 3
   Not Offered: 2
   Left a Message: 1
   Hung up on Hold: 3
   Hours/Availability: 1
   Key Person N/A: 2
   Cancelled Appt.: 1
   Answering Serv.: 2
   Undefined: 3
Post Treatment Quest.: 6
   Side Effects: 2
   Post Op Care: 3
   Prescript. Refills: 1
Pre Treatment resch.: 2
Product/Home Device: 5
Other: 5

Condition/Treatment
Breakdown

Laser Hair Removal: 25%

Microdermabrasion: 13%

Tattoo Removal: 10%

Cellullite Treatment: 4%

Skin Rejuvenation: 15%

Stretch Marks: 8%

Chemical Peels: 14%

Other: 9%

910 —

Call Details

| Date | Duration | Outcome | Condition | Staff |
|---|---|---|---|---|
| 12/11 | 2:30 | Booked Appt | Laser Hair Removal | Pam |
| 12/9 | 2:00 | Existing Pat. | Laser Hair Removal | Pam |
| 12/9 | 1:45 | Existing Pat. | Laser Hair Removal | Pam |
| 12/4 | :40 | Hung up | Tattoo Removal | Bob |
| 12/1 | :38 | Booked Appt | Acne Scars | Tom |

METHOD AND SYSTEM FOR AUTOMATIC CALL TRACKING AND ANALYSIS

RELATED APPLICATION

This application is related to U.S. patent application Ser. No. 12/368,155, entitled "Method of Patient-Staff Analytics," filed on Feb. 9, 2009, which is incorporated herein.

FIELD OF THE INVENTION

This generally relates to phone call tracking and analysis, and more particularly to methods and systems for automated phone call tracking and automatic phone call content and outcome analysis.

BACKGROUND

Conventionally, there is no readily accessible way for companies or organizations, such as medical practices, to monitor interactions between staff and potential or existing customers in an objective or quantifiable manner. Valuable data about a staff's performance in addressing concerns and needs of potential clients is often lost during the interaction due to lack of reporting mechanisms and poor internal communication. Companies and other organizations are unable to determine whether potential revenue is lost due to poor staff performance, whether marketing strategies are successful, whether staff are appropriately meeting the needs of clients, or whether the company is properly allocating its resources into capital investments in services or products driven by market demand. This lack of oversight causes companies and organization to incur significant loss of potential revenue while diminishing client satisfaction.

Conventional quality control call centers within an organization, or third-party quality control centers, record telephone calls for quality assurance purposes. For example, U.S. Pat. No. 6,724,887 to Eilbacher et al. discloses a contact center which records and analyzes customer communications. The contact center includes a monitoring system which records customer communications, reviews the communications to identify parameters of the communications and determines whether the parameters of the customer communications indicate a negative or unsatisfactory experience. The analyzing unit performs a stress analysis on telephone calls to determine a stress parameter by processing the audio portions of the telephone calls to ultimately determine whether the experience of the caller was satisfactory or unsatisfactory. However, this does not analyze the content or outcome of a call.

Typical conventional services are normally offered by consultants seeking to provide general advice for enhancing performance within a large organization. Such services are normally not affordable for many companies, such as smaller medical practices, interested in learning how well they perform with respect to other smaller companies. Furthermore, such conventional systems are intended to be provided infrequently using set parameters, and do not allow the user to constantly interact with the quality assurance system directly over a long period of time. These consultants may also not give actionable intelligence, and conventional automated systems do not give intelligence on the content or outcome of a call. They also do not provide for efficient lead generation tracking, e.g., determining how a caller found out about the business.

Furthermore, other conventional systems involve obtaining survey data from various businesses through questionnaires for the purposes of comparing the performance of the various staffs of each office. However, one problem with surveys is in obtaining accurate data from staff because staff employees may not be truthful in their interactions with clients. Staff may also not be aware of perceptions of themselves by clients. Conventionally, these businesses also have no ability to compare their office's performance with that of other offices of other comparable businesses.

One field typically suffering from many of the above-mentioned problems is the medical practice field. Medical practices often have difficulty knowing if their staff is successfully interacting with patients and potential patients when discussing potential treatments. However, many other companies and organizations, both large and small, suffer the same or similar problems.

Conventional systems do not automatically analyze the content of a call, providing analytics and the result of the outcome of a call. Accordingly, there is a desire for to avoid these and other related problems.

SUMMARY

In accordance with methods and systems consistent with the present invention, a method in a data processing system is provided for automatically determining an outcome of a phone call, comprising receiving voice data of a phone call, and analyzing the received voice data. The method further comprises automatically determining the outcome of the phone call based on the analysis of the received voice data.

In another implementation, a data processing system is provided for automatically determining an outcome of a phone call, comprising a memory configured to store instructions to cause a processor to receive voice data of a phone call, analyze the received voice data, and determine the outcome of the phone call based on the analysis of the received voice data. The data processing system further comprises a processor configured to execute the instructions.

In yet another implementation, a method in a data processing system is provided for automatically determining an outcome of a phone call, comprising receiving the phone call from a caller, recording the phone call, and creating voice data from the recording of the phone call. The method further comprises automatically transcribing the received voice data of the phone call into text data, analyzing the transcribed text data and automatically determining the outcome of the phone call based on the analysis of the transcribed text data. The outcome comprises one of: (1) the caller left a message, (2) the caller hung up while on hold, (3) the caller is an existing client, (4) the caller booked an appointment, (5) the caller was connected to an answering service, (5) the caller did not book an appointment, (6) the caller purchased a product, and (7) the caller asked for information.

BRIEF DESCRIPTION OF THE DRAWINGS

FIGS. 5a-5c depict a flow chart of a method and system for determining the call outcome of a phone call in accordance with methods and systems consistent with the present invention.

FIG. 6 depicts a chart of a method and system for determining the call outcome of a phone call in accordance with methods and systems consistent with the present invention.

FIG. 9 depicts an exemplary screen shot showing an example of a report generated based on information collected.

DETAILED DESCRIPTION

Figure 1:
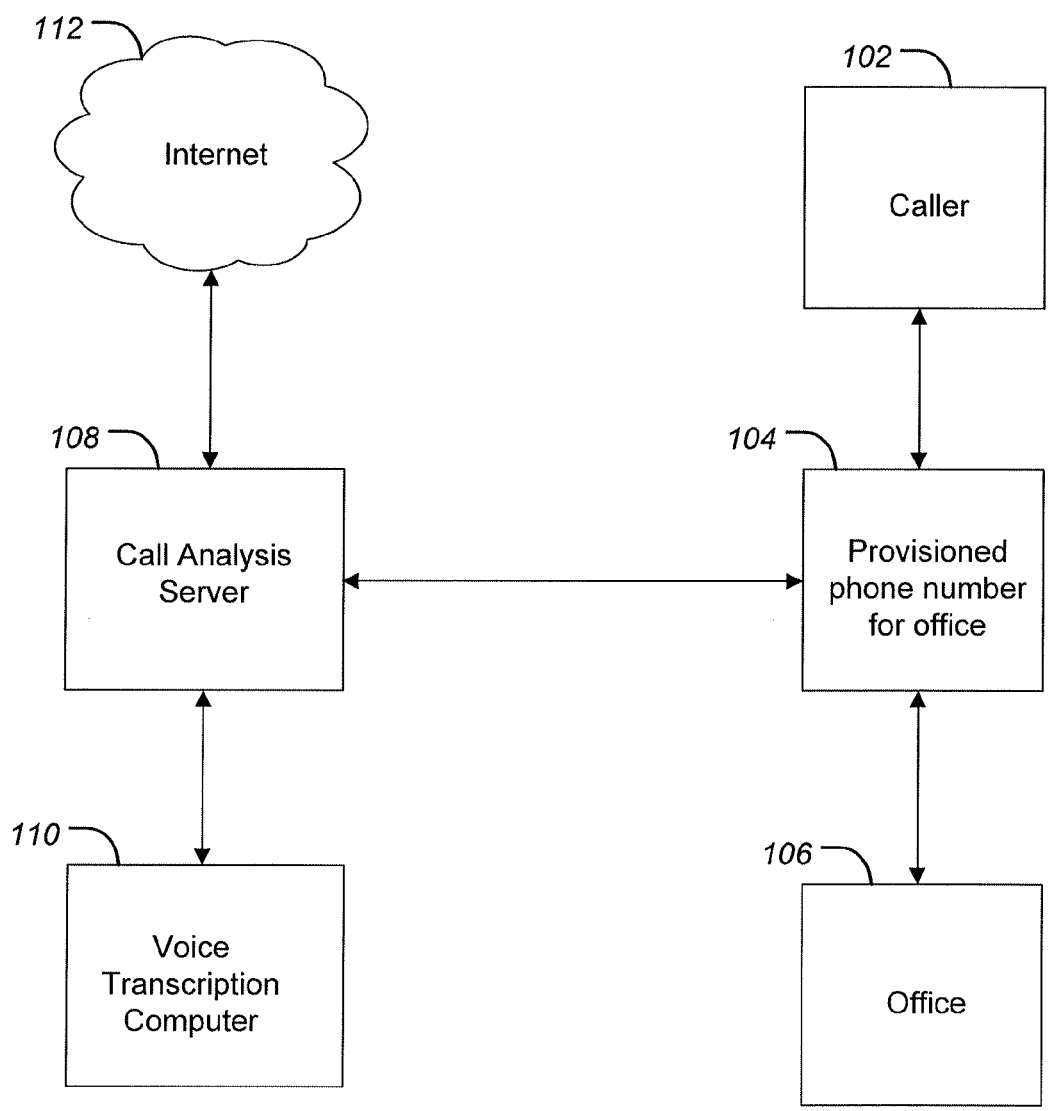
FIG. 1 illustrates a diagram of an exemplary computer system in accordance methods and systems consistent with the present invention.

Methods and systems in accordance with the present invention provide automatic phone call tracking and analysis of the content and outcome of a call. These systems may provide businesses with the ability to track and view analytics of the number, content and various outcomes of calls, thereby providing up-to-date, automatically-generated real-time analysis of the results of client interactions with staff answering the phones. Methods and systems in accordance with the present invention quantitatively and objectively analyze staff performance and marketing return on investment (ROI), and track customer demand across various procedures. This may automatically provide information on the number of calls with various outcomes, e.g., the customer booked an appointment, the customer hung up while on hold, the customer was connected with voicemail, the customer left a message on voicemail, the customer is an existing client, the customer did not book an appointment, the customer did not book due to cost concerns, the customer purchased a particular product, etc., as well as other details about the calls.

In one implementation, the methods and systems operate via an automated online software application that operates over a network such as the Internet. The application tracks and sorts incoming phone calls, automatically analyzes the phone calls, and generates reports that determine patient conversion, staff performance, marketing effectiveness, customer interests, and call outcomes. They may also provide comparative analysis reports with similar businesses.

Generally, when a phone call is received, the system records the call, automatically transcribes the voice data from the call into text, and then analyzes the transcribed text file. In doing so, the system may determine the outcome of the call as well as other aspects of the content of the call. For example, the system may determine if the caller left a message, hung up, is an existing patient, booked an appointment, asked for information, purchased a particular product, did not book an appointment or if a certain course of action was determined. For example, in the medical field, the system may automatically determine the condition or treatment of the patient, e.g., the caller is likely suffering from a certain condition and likely needs a certain treatment or product.

In particular, in one implementation, methods and systems in accordance with the present invention assist medical practices with tracking and analyzing patient and staff interaction analytics. The methods and systems record telephone conversations to obtain objective data to compile comparative reports across the medical sector, while at the same time enable access to actual recorded conversations for staff accountability and/or for use as specific examples of performance quality.

The analytics may be useful for businesses to determine the performance of the staff. For example, the booking percentage (percentage of callers who booked an appointment) may be an indicator of how well a staff is performing on the phone. In another example, a high percentage of calls having an outcome of the caller hanging up while on hold may indicate that there are an insufficient amount of staff members to handle incoming calls. The call analytics may be very helpful for large companies and quality assurance procedures. The analytics provide the ability to compare with other similar businesses to see how the staff is performing in comparison with those businesses. The comparison with other businesses may include performance comparisons of booking percentage, waiting times, number of calls, etc. It also provides for the analysis of individual staff members, such as seeing which staff member has the highest or lowest booking percentage, the highest or lowest hang up rate, etc.

FIG. 1 illustrates a diagram of an exemplary computer system in accordance methods and systems consistent with the present invention. As shown, a caller 102 calls a phone number 104 specifically provisioned for the company, in this example a doctor's office 106. The call analysis server 108 provides and/or has access to the provisioned phone number. The provisioned phone number 104 may be operated by a third-party provider, for example. In another implementation, the caller 102 may call the doctor's office number 106 directly, and the system may record the direct call. The provisioned phone number 104 may correlate to the doctor's account on the call analysis server 108 so that the call analysis server may associate the call with the correct office 106. When the call comes through, the system may play a brief recording notifying the caller 102 that the call is about to be recorded. It may also immediately patch the call into the doctor's office 106 seamlessly. The call is then recorded by the call analysis server 108, and the resulting data file is stored on the server's database (not shown). As discussed further below, the call may be transcribed by a third-party computer system 110. As also discussed below, the call analysis server 108 may be connected to a network such as the Internet 112 so that users may access the results of their call analytics reports for their offices. These and other component may be used.

Figure 2:
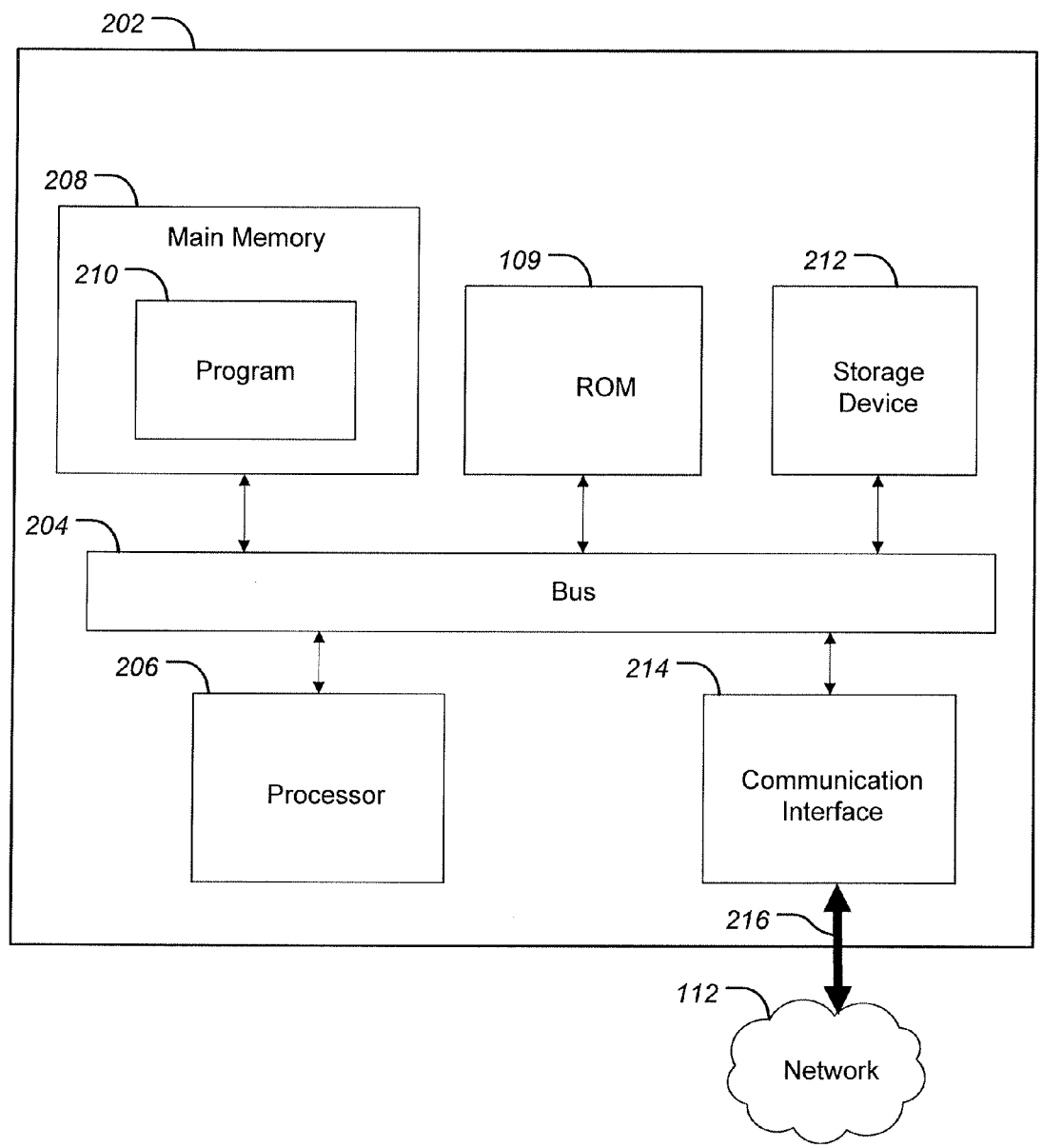
FIG. 2 depicts components of an exemplary computer in accordance with methods and systems consistent with the present invention.

FIG. 2 depicts components of an exemplary computer 202 in accordance with methods and systems consistent with the present invention. The computer 202 may represent call analysis server 108, computers of office 106, a computer accessing the call analysis server 108 over the Internet 112, the voice transcription computer 110, or any other suitable component.

Computer 202 includes a bus 204 or other communication mechanism for communicating information, and a processor 206 coupled with bus 204 for processing the information. Computer 202 also includes a main memory 208, such as a random access memory (RAM) or other dynamic storage device, coupled to bus 204 for storing information and instructions to be executed by processor 206. In addition, main memory 208 may be used for storing temporary variables or other intermediate information during execution of instructions to be executed by processor 206. Main memory 208 includes a program 210 for implementing automatic call tracking, analysis and reporting in accordance with methods and systems consistent with the present invention. Modules and filters discussed below may be part of this program 210 and/or stored in main memory 208. Computer 202 further includes a read only memory (ROM) 109 or other static storage device coupled to bus 204 for storing static information and instructions for processor 206. A storage device 212, such as a magnetic disk or optical disk, is provided and coupled to bus 204 for storing information and instructions.

According to one embodiment, processor 206 executes one or more sequences of one or more instructions contained in main memory 208. Such instructions may be read into main memory 208 from another computer-readable medium, such as storage device 212. Execution of the sequences of instructions in main memory 208 causes processor 206 to perform the process steps described herein. One or more processors in a multi-processing arrangement may also be employed to execute the sequences of instructions contained in main memory 208. In alternative embodiments, hard-wired circuitry may be used in place of or in combination with software instructions. Thus, embodiments are not limited to any specific combination of hardware circuitry and software.

Although described relative to main memory 208 and storage device 212, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Computer 202 also includes a communication interface 214 coupled to bus 204. Communication interface 214 provides a two-way data communication coupling to a network link 216 that is connected to a network 112, such as the Internet or other computer network. Wireless links may also be implemented. In any such implementation, communication interface 214 sends and receives signals that carry digital data streams representing various types of information.

In one implementation, computer 202 may operate as a web server on a computer network 112 such as the Internet. Computer 202 may also represent other computers on the Internet, such as users' computers having web browsers, and the user's computers may have similar components as computer 202. As described above, the computer 202 may be a call analysis server having the components described above and may implement methods and systems consistent with the present invention.

Figure 3:
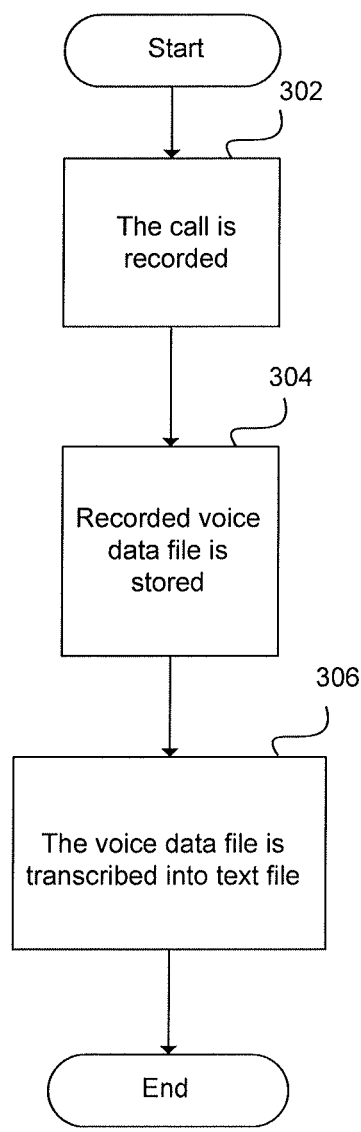
FIG. 3 illustrates a flow chart showing steps in a method for transcribing a call.

FIG. 3 illustrates a flow chart showing steps in a method for transcribing a call. First, the call is recorded (step 302), and the recorded voice data file is stored (step 304). Next, the voice data file is transcribed by voice transcription software and/or hardware, which may be located on the server 108, or may be a third-party transcription computer system 106 (step 306). The voice data file may be transcribed into text, or in another implementation, into XML or any other suitable format. The voice data file is run through various modules and filters described below during the analysis process.

Figure 4:
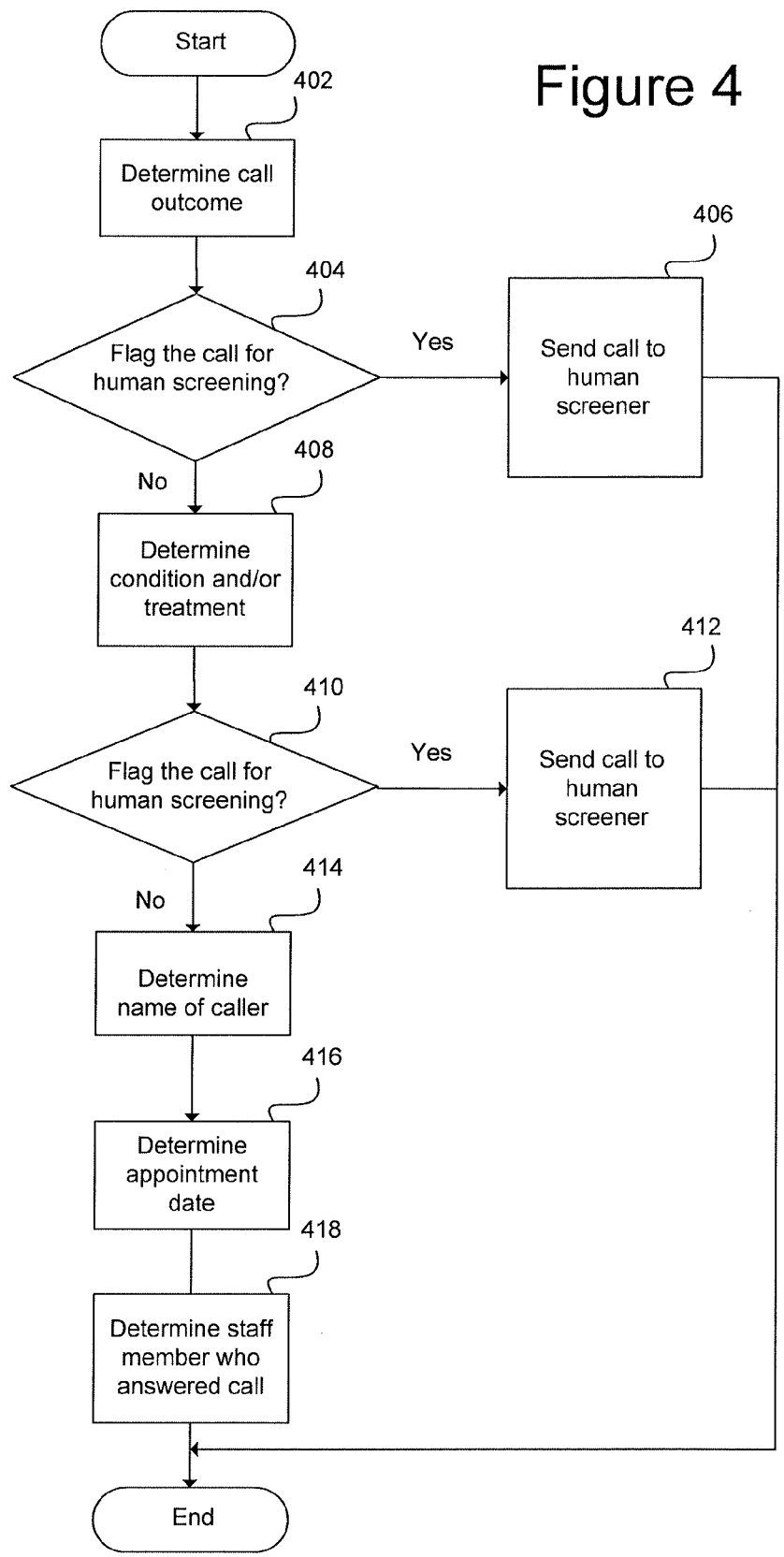
FIG. 4 depicts a flow chart of a method and system for processing and analyzing a phone call in accordance with methods and systems consistent with the present invention.

FIG. 4 depicts a flow chart of a method and system for processing and analyzing a phone call in accordance with methods and systems consistent with the present invention. Once the call's voice data file has been transcribed into text (see FIG. 3), the transcribed text is then analyzed. The text may go through several modules and filters of analysis during this process. Modules and filters may be software or software subroutines, hardware, a combination of software and hardware, or any other suitable component. Modules and filters examine the text of the file, search for key words and phrase patterns and may include logic statements used to match various features, as well as external factors associated with the call such as call duration. The first module determines the call outcome (step 402), the process of which is described in further detail below (see FIG. 5). The call outcome may be, for example, the caller left a message, hung up while on hold, is an existing patient, booked an appointment, reached an answering service, or asked for information. However, other outcomes are also possible.

During the call outcome determination process, it may be determined that the call needs to be flagged for screening by a human screener. This may occur for several reasons including, for example, the system cannot determine the outcome accurately due to the call not matching predetermined criteria or the call matching several potential options, thereby leaving an ambiguity. If the call is flagged (step 404), it is then routed to a human call screener either immediately or flagged for later screening by a human call screener (step 406). If the call is not flagged, the process continues to the next module, in this case, the condition and treatment module (step 408).

However, flagging the call for human intervention is not required. In one implementation, the call is processed automatically by the call analysis server 108, and the likelihood of accuracy is assigned to the file and displayed after the processing. In addition, easier data to process (as described below) could be processed first so that the human screener is given as much data as possible before they begin their screening. Depending on the manner in which the system is set up, in one implementation, a vast majority (e.g., 85%) of calls may be screened automatically, and a minority of calls (e.g., 15%) into an office are screened by humans. In addition, flagging may be used on some of the modules, but not all of them. For example, the call outcome and condition or treatment may be important to label, but the name of the patient, appointment date, and staff member may not be as important. In this case, the call outcome and condition or treatment may be able to be flagged, while the other modules are not.

This exemplary implementation involves a medical practice, particularly in the field of dermatology and plastic surgery. In this example, the condition and treatment module automatically determines the condition and treatment for the patient in a medical setting (step 408). This information may be used for further granularity and analytics and is discussed in further detail below (see FIG. 7). During the condition and treatment process, it may be determined that the call needs to be flagged for screening by a human screener. If the call is flagged (step 410), it is then routed to a human call screener either immediately or flagged for later screening by a human call screener (step 412). If the call is not flagged, the process continues to the next module, in this case, the determination of the caller's name (step 414).

Next, the system determines the name of the patient in an additional module (step 414). In this process, the system may search the transcribed text file for the word "spell" and the spelling of any name in the call. For example, if a person on a call spells their name letter by letter, the system may be able to determine the name of the caller. Alternatively, the system may have a list of common names or names of existing clients to search for in the text, or use caller ID information associated with the caller's phone number. Any other suitable manner of determining the name may be used.

After determining the name of the caller, the system determines a date if any, in this case an appointment date (step 416). In other situations, the date determined may pertain something else. In one implementation, this process can be bypassed if the assigned call outcome was "answering service," "hung up on hold," or "left a message." In this process, the system searches the text file to identify an agreed-upon date of an appointment. The system may search for dates in the text, possibly in conjunction with the word "appointment." Outside data may also be used as well. For example, if the caller says "August 4$^{th}$," the system may insert the current year at the end to make it "Aug. 4, 2010." The appointment time may also be determined similarly. Any other suitable manner of determining the date or time may be used.

Finally, the staff member who answered the phone call is determined (step 418). In one implementation, this may be determined by searching the text file for a name and comparing it to inputted staff member names from that office. In addition, many times, staff members introduce themselves on a phone call, often at the beginning of the call as the call is answered. In another implementation, this may be determined by comparing a voice sample in the voice data file with previously-recorded voice samples of staff members, possibly stored in an MP3 file. This comparison may be done with third-party software or systems. When these names, dates, outcomes and conditions or treatments are determined, they may be assigned and save to a call file for reporting. The information may be stored in a database, for example.

Figure 5B:
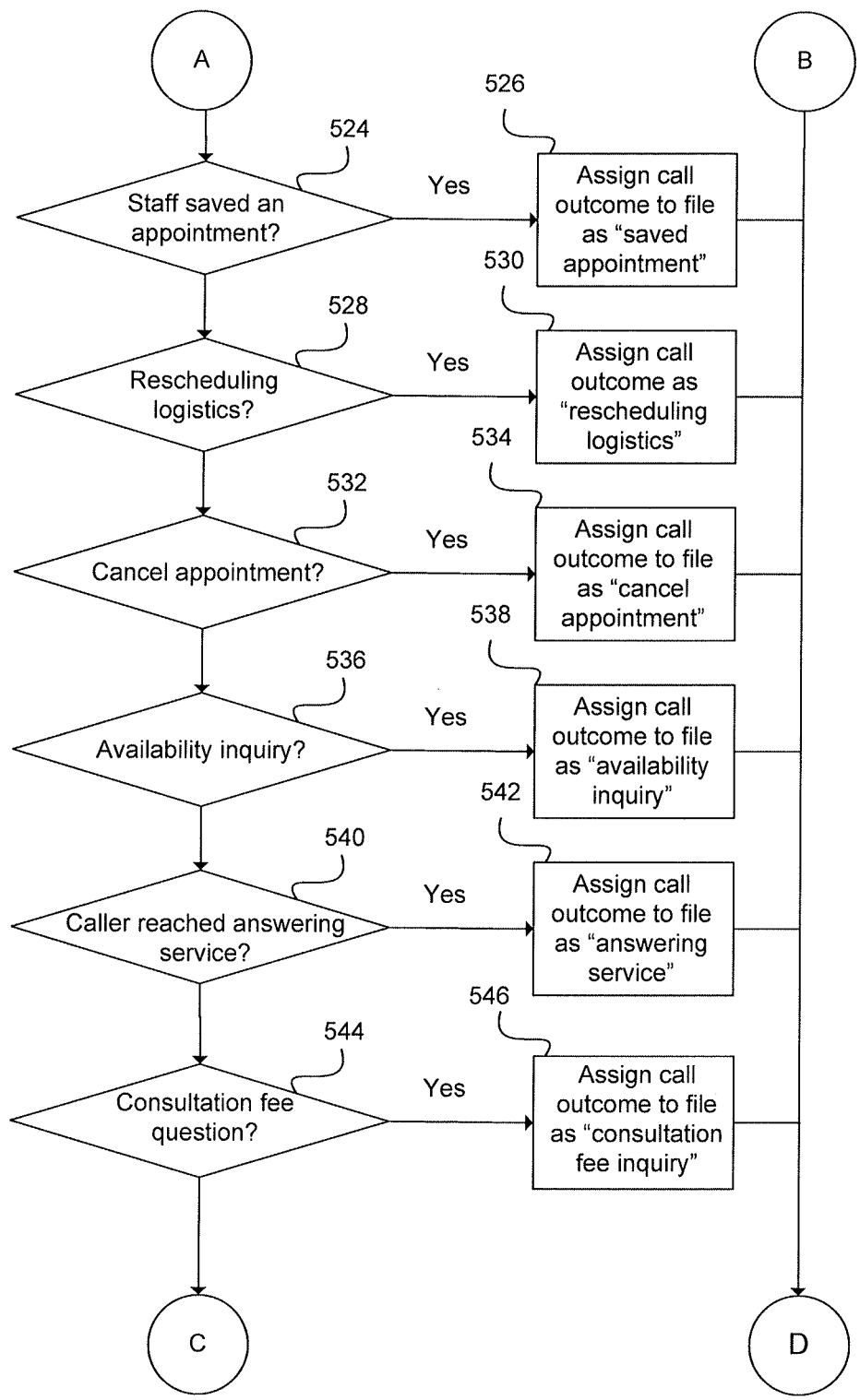

FIGS. 5*a*-5*c* depict flow charts of a method and system for determining the call outcome of a phone call in accordance with methods and systems consistent with the present invention. To determine the outcome of a call, the call is monitored and transcribed as above. The transcribed text file of the call is then parsed (step 502). The text may be run through several filters sequentially, which, in one implementation, are in a purposeful order. For example, if a caller booked an appointment and then hung up while on hold, the hang up while on hold outcome may trump the booked appointment, and the outcome would be a hang up while on hold. As such, this outcome may be determined first before getting to the booked appointment outcome. For example, the first two outcomes (e.g., hung up on hold and left a message) are definitive and may not be based on keyword matching like some other filters. False positives could result if they were not considered first, e.g., a person who inquires about a consultation fee and then hangs up while on hold has an outcome of hang up on hold even though they inquired about a consultation fee first.

In one implementation, the various outcome modules are checked against the transcribed text in a sequential order, running through as many of the checks as needed before a definitive answer is determined. In another implementation described in further detail below, all of the modules are not checked in order, but rather after an initial check on the beginning of the phone call, a path is determined that narrows down the possible remaining modules that may apply to the call, and only those modules are checked. This may be done in the form of a "decision tree" that reduces the possibilities left as the process progresses.

In one implementation, the call analysis server 108 first checks whether the caller left a message (step 504) by sending the transcribed text through a left a message filter. This filter may determine whether the caller left a message in several ways, including, but not limited to, identifying key indicators such as checking for speech after a beep. Also, the transcribed text file may be scanned for keywords that are commonly used with an answering machine (e.g., "leave a message," "we will return your call," etc.) If the caller left a message, a call outcome may be assigned to the call file (step 506), and the process may continue to the next module (e.g., the condition/treatment module, see FIG. 4).

Next, the call analysis server 108 determines if the caller hung up while on hold (step 508). Potential key indicators of this include the caller hanging up while music is playing, the caller hanging up while a voice recording is playing, or any other suitable indicator. If the caller hung up while on hold, a call outcome is assigned to the call file indicating a hang up while on hold (step 510), and the process may continue to the next module.

Then, the next filter in the system determines whether the caller is an existing patient or client (step 512). It may do so in any of a number of suitable manners, including, for example, searching the text file for key indicators such as common questions and answers and making a determination based on them. For example, if the phrase "are you an existing patient?" is followed by the word "yes," it is an indication of the caller being an existing patient. Other questions and answers may be used in the search of the text file. In addition, the text file may be searched to determine if the caller is calling to confirm or cancel an existing appointment, which is also an indication that the caller is an existing patient. For instance, the system may search for the words "cancel" and "appointment." Although a caller could bring up the word "cancel" when booking an appointment (e.g., asking about a cancellation policy), the system may distinguish between these two types of calls by the call duration, whereas a caller cancelling an appointment might take less time. Other phrases may be searched for to determine if the caller is an existing patient including, for example, the phrases "I was a patient there years ago," "I think I made an appointment there," or "I need to make a follow-up appointment." Other suitable indicators of an existing patient may also be used. If the caller is an existing patient, a call outcome may be assigned to the call file indicating that the caller is an existing patient (step 514), and the process may continue to the next module.

In the next filter, the call analysis server 108 may determine whether the caller was calling for a key person who was not available (step 516). The call analysis server 108 may determine this by searching for inquiries into a condition or treatment and/or booking an appointment, and the staff replies with a phrase such as "x isn't available," or "x is with a patient," "can I have her/him call you," and the caller or staff states the caller's phone number for a return call, e.g., "5-5-5-2-1-6-5-2-0-9." In this case, the call analysis server 108 may assign a key person not available call outcome of (step 518).

Then, the next filter in the system determines if the caller booked an appointment (step 520). The filter may search for key indicators in the text file such as a date (that is being scheduled) and the words "appointment" or "consultation." The system may also search for a spelling of the patient's name as an indicator that they are booking an appointment. Other suitable indicators may also be used. If the system determines that the caller booked an appointment, the call file is assigned an outcome of booked an appointment (step 522), and the system continues to the next module.

The call analysis server 108 may also determine if the call outcome is that a previously-made appointment is saved from being canceled, a special circumstance when a patient calls with a prior appointment (mentioning to confirm, reschedule, etc.) and begins to ask cost questions or treatment effectiveness, and the staff keeps the patient with their current appointment rather than cancelling (step 524). In such a call may begin with terms such as "rescheduling," "confirming" or "canceling," and include further discussions regarding cost, treatment effectiveness, etc. and then discussion regarding keeping the current appointment, e.g., "see you on x date." The call analysis server 108 may determine this outcome by analyzing, for example, the length of the call, whereas these calls are typically longer than average calls. If it is determined that the staff saved an appointment from being cancelled, a call outcome of saved appointment may be assigned (step 526), and the system continues to the next module.

Another potential call outcome is pre-treatment rescheduling/logistics. The call analysis server 108 may determine if a patient reschedules a booked appointment (step 528). For example, it may determine if a patient mentions they "have an appointment" or "need to confirm" their appointment, and reschedules to a new date when they will come in. It may also include logistical questions like "I have an appointment," "how do I get to the office," or "where are you located," etc. and end with phrases such as "ok, that works," "see you on x date," etc. Other suitable indicators may also be used. If the appointment is rescheduled, and does not classify as a saved appointment, it may be assigned a call outcome of pre-treatment rescheduling logistics (step 530).

The call analysis server 108 may also determine if a caller called to cancel an existing appointment (step 532). For example, for a caller who has an appointment already scheduled, the call analysis server 108 may search for the phrase "cancel their appointment" and determine that the caller does not reschedule to a new date or time. Such a call may begin with phrases such as "rescheduling," "confirming" or "canceling" an appointment, and ends with the canceled appointment the end, e.g., the phrase "your appointment is cancelled)." If it is determined that the caller canceled an existing appointment, the canceled appointment call outcome is assigned (step 534) and the system continues to the next module.

Moreover, the call analysis server 108 may determine that the caller was inquiring about an appointment but could not find convenient hours and availability for an appointment (step 536). In this case, the caller may have a prior appointment or be a new patient, and after stating a phrase such as "make an appointment," "come in for a consultation" or "when can I come in," the office staff offers appointment dates that the caller cannot agree to, i.e., it is not a booked appointment outcome. It may be determined that appointment was not booked due to lack of availability, and the availability outcome is assigned (step 538).

The next filter in the system may determine whether the caller was connected to an answering service (step 540), for example, by searching for key phrases in the text file such as "office" or "answering service." The system could also retrieve the office hours or reasonable hours for that time zone to confirm. This may also involve the office personnel inputting the hours their answering service is active to the system. If the system determines that the caller was connected to the answering service, the call file is assigned an outcome of answer service (step 542), and the system continues to the next module.

The call analysis server 108 may determine that the caller inquired about an initial consultation fee and/or did not book an appointment as a result of there being a consultation fee (step 544). This may be determined by searching for phrases such as "consultation fee," "initial consultation," and "cost to come in," etc. A not converted due to consultation fee inquiry call outcome may be assigned (step 546). Other suitable indicators may also be used, and the system moves to the next module after assigning the associated outcome.

The call analysis server 108 may detect that the caller had cost concerns and/or didn't book an appointment as a result of there being cost concerns by determining if the caller makes an inquiry about a certain condition or treatment and states various phrases such as "how much does it cost," "payment plans," "financing," etc (step 548). Furthermore, the call may end with terms such as "Ok, thanks," "I will call back," etc. indicating the caller did not book an appointment, and that cost concerns could be primary reason why. Other suitable indicators may also be used. In this case, a cost concerns call outcome is assigned (step 550). Again, other suitable indicators may also be used, and the system moves to the next module after assigning the associated outcome.

The call analysis server 108 may also determine that the caller was informed that the office does not provide the product or service the caller desired (step 552). For example, if the caller inquires about a specific condition or treatment, and the staff replies "we don't offer x," "we don't treat x," "we don't have x," it may be determined to be a product/service not offered call outcome (step 554).

One general category of call outcomes may be post-treatment questions. The call analysis server 108 may determine that the caller is calling regarding side effects, post-operation care, or prescription refills (step 556). To determine if the caller is calling about side effects, the call analysis server 108 may search for phrases indicating that the caller is an existing patient as described above, e.g., "I saw Dr. Jones," or "I just had treatment," and the caller asks questions regarding "redness," "burning," "bleeding," or "pain" for example. These indications, in addition to the call not falling into the booked outcome condition may indicate post-treatment questions, and that outcome may then be assigned (step 558).

An additional general category is a product inquiry. The call analysis server 108 may determine, for example, if a caller calls in reference to a particular product (for example, cross referenced from the office's products as described further under Conditions/Treatments), and the office confirms that they have it (step 560). They call analysis server 108 may determine that the customer or patient has stated a product name and/or other phrases such as "can you ship that to me," etc. A product inquiry call outcome may be assigned in such a case (step 562). If the call matches none of these, it may be flagged for human screening (step 564) and/or given a call outcome of undefined.

FIG. 6 depicts a chart of a method and system for determining the call outcome of a phone call in accordance with methods and systems consistent with the present invention. In one implementation, the call outcome is not determined linearly as previously described, but rather by a particular path down a "decision tree" having branches of paths that end in various call outcomes. This implementation may be a preferred implementation over the previously described linear process due to potentially increased efficiency. In such an implementation, less comparisons, filters or evaluations may need to be made to determine the call outcome. This implementation is also somewhat predictive of a call outcome, because once an initial determination is made, the remaining possibilities left in the decision tree are greatly reduced. This reduces the need to go through many modules and filters sequentially.

In this implementation, the beginning of the call transcript 602 is first analyzed. Typically, the sentences at the beginning of a call may determine the outcome or may limit the likely possibilities of the outcome of the call. For example, when a person begins speaking, the first thing they ask for may be a significant indication of the likely outcome(s) of the call. This indication may choose an associated decision tree of paths of possible outcome and decisions to be made to determine the outcome.

First, the initial portion of the call is parsed, and this portion may be of any length, e.g., the first 15 seconds of the call, the first three sentences, etc. It is searched for one of several exemplary opening paths 604-612. The initial portion of the call may be searched to see if it fits one of several categories which may determine the initial path and decision tree used, including, for example, "I need to confirm my appointment," 604 "I'd like to cancel my appointment," 606 "Do you offer (x)?" 608 "I'm interested in (x), how much does that cost?"

610 "I'd like to book a consultation, etc." 612. For example, if the call begins with the sentence "Hi, I want to confirm my appointment," it may be determined that it is likely that the caller has an appointment and a corresponding particular decision tree 614 should be traversed to determine the outcomes. For example, this decision tree 614 may have the call outcomes of hung up on hold 616, a saved booked appointment 618, or any other suitable outcome, i.e., the likely call outcomes from the initial portion of the call. The filters 620-624 are traversed until the process arrives at an outcome 616-618. The example outcomes and filters shown on FIG. 6 are merely examples and are not an exhaustive list. Although not shown on the figure, a decision tree is associated with each of these initial paths 604-612.

This decision tree may not include many of the other call outcomes due to the unlikelihood of resulting in those call outcomes from the initial portion of the conversation. As such, this decision tree may be traversed to the correct call outcome quicker. The resulting reduced number of call outcomes in the decision tree may be traversed with keyword matching and other indicators as described previously. Decision trees may be designed in any manner and may be adapted to many different purposes and industries.

Figure 7:
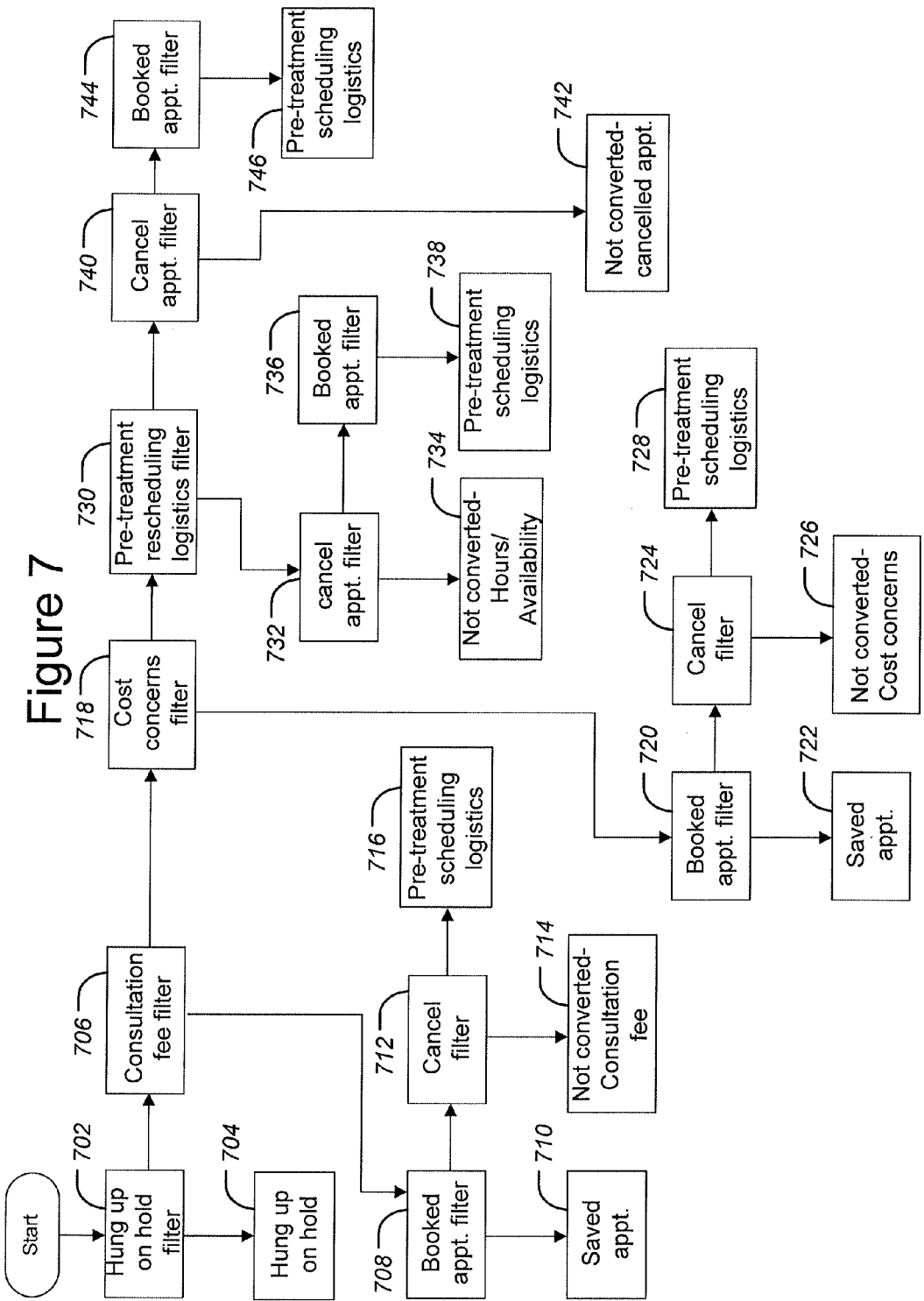
FIG. 7 shows an exemplary decision tree based on an exemplary initial path.

FIG. 7 shows an exemplary decision tree based on an exemplary initial path. The decision tree may have several different call outcomes as the various end nodes of the tree. For example, if the previously mentioned call ("I need to confirm my appointment") requested a confirmation of the appointment, it may result in several likely call outcomes (e.g., Pre-treatment rescheduling/logistics, saved booked appointment, not converted due to consultation fee, etc.) The decision tree process may then check a first tier of filters or path identifiers to determine the path that will be traversed. In one implementation, this first tier of filters is traversed in sequential order. As shown on FIG. 7, this exemplary decision tree has six filters in the first tier. In this case, the first filter in the decision tree is the hung-up-on-hold filter 702 previously described. If this filter 702 is satisfied, then the system traverses the decision tree to the outcome hung-up-on-hold 704. Many of the filters described below are the same or similar to filters or modules previously described above.

If this first filter hung-up-on-hold filter 702 is not triggered, the system moves to the next filter on the first tier which is a not converted due to consultation fee filter 706. In this example, this filter determines if the caller inquired about a consultation fee before proceeding to a second tier of filters. The rest of the decision tree past the second tier includes outcomes that are probably and/or possible given the results of the previous path in the tree (i.e., caller needs to confirm appointment and is asking about a consultation fee). If the answer is yes, the decision tree examines the call with the first filter in the second tier, in this case, a booked appointment filter 708. If the booked appointment filter determines that the caller maintained their booked appointment, a saved appointment outcome 710 is assigned because the caller kept the appointment despite the hesitancy over the cost of the consultation fee.

If the booked appointment filter 708 determines that is not a booked appointment, the call analysis server 108 continues to the next second tier filter, a cancelled appointment filter 712 in this example. If the cancel appointment filter determines that the caller wants to cancel the appointment, a call outcome of not converted due to consultation fee is assigned 714. If the appointment is not canceled at that point, it could default to the most likely outcome at this stage in the path resulting in an outcome of pre-treatment rescheduling logistics 716.

If the consultation fee filter 706 on the first tier of the decision tree determines that the consultation fee was not inquired into, the process continues to the third filter on the first tier, the cost concerns filter 718. If the cost concerns filter determines that the caller has cost concerns, it continues to the second tier filters under the cost concerns filter 718. Here, the first second-tier filter is a booked appointment filter 720. If the booked appointment filter 720 determines that the caller maintained the booked appointment despite the cost concerns, a saved booked appointment outcome is assigned 722. If the booked appointment filter 720 determines that the appointment was not booked, the call analysis server 108 continues to the next second tier filter 724. In this example, this filter is a cancel appointment filter 724. If the cancel appointment filter 724 determines that the caller wants to cancel the appointment, a call outcome of not converted-cost concerns 726 is assigned. If the appointment is not canceled at that point, an outcome of pre-treatment rescheduling logistics 728 is assigned.

If the cost concerns filter 718 on the first tier returns a negative result, the process continues to the fourth filter on the first tier, in this case, a pre-treatment rescheduling logistics filter 730. After calling to confirm their appointment, if the caller indicates a desire to reschedule their existing appointment to another date, the process continues down the decision tree to the first second-tier filter, a canceled appointment filter 732. If this filter 732 determines that the caller is canceling their appointment because they could not find an alternative date that was satisfactory, an outcome of not-converted-hours and availability 734 is returned. Here, the second, second-tier filter is a booked appointment filter 736. If the booked appointment filter 736 determines that the caller successfully reschedules their booked appointment, the pre-treatment rescheduling/logistics outcome 738 is assigned to the call file.

If the fourth, first-tier filter 730 returns a negative, the system proceeds to the fifth, first-tier filter, which is a cancel filter 740. If this filter 740 is triggered, a call outcome of not-converted-canceled appointment 742 is returned. It is noted, for example, although two tiers are shown here, any number of tiers of filters may be used.

Finally, if the fifth, first-tier filter 740 returns a negative, a booked appointment filter 744 is checked. In one implementation, the most likely outcome of the decision tree (in this case, based on "I need to confirm my appointment") if none of the other first tier filters were triggered, is the last filter on the first tier. In this instance, a caller asks to confirm their appointment, and then confirms that they will be attending their booked appointment. If this filter 744 determines that it is a booked appointment, the outcome of pre-treatment rescheduling and logistics 746 is returned.

This process may also give an indication of the likely nature of a call to a human screener even if the call analysis server 108 cannot accurately determine an exact call outcome and flags the call for further human screening, or make the most likely determination of the outcome based on how and where the call progressed through the decision tree. These decision trees may be short and simple or longer or complicated and may be designed to facilitate the purpose for which the call system is being used, whether it is a small medical office, a large computer company, or any other organization. Additionally, there may be some call outcomes that, in one implementation are common to all decision trees, such as the hung up on hold call outcome, for example.

Figure 8:
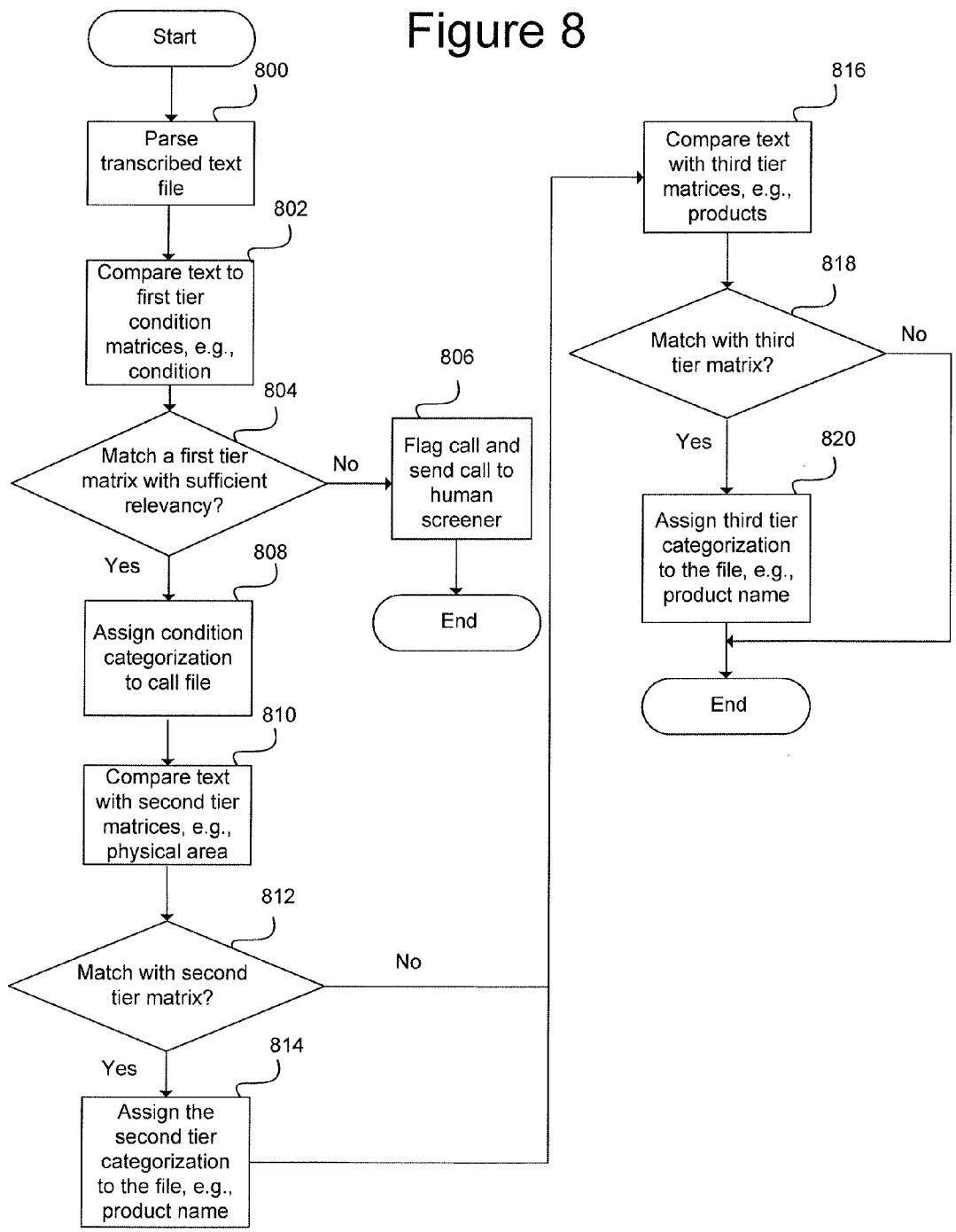
FIG. 8 depicts a flow chart of the process of determining a condition or treatment in a phone call.

FIG. 8 depicts a flow chart of the process of determining a condition or treatment. In one implementation, this process is used to determine a condition or treatment in a dermatological and plastic surgery setting. However, other conditions or aspects of a caller's phone call may be determined for any suitable industry or purpose. For example, the instead of a condition or treatment, the system may determine the subject matter of the call, whether a caller's question was answered, whether the caller is satisfied with the result of the call, whether a particular product is discussed, whether there is a customer service complaint, whether a type of service was discussed, or any other suitable aspect. First, the system parses the transcribed text file (step 800). In one implementation, the system may use the previously parsed transcribed text file (see FIG. 5). Then, to determine a categorization indicating a condition, the system matches the transcribed text file to a phrase matrix that is associated with a specific condition or treatment category and applies additional logic on how the phrases appear together, what order, frequency, relevancy, etc. (step 802). The matrix may be a list of terms that are relevant or indicative of the condition. The condition may be determined by the strength of the text file's relevance to a particular condition or treatment matrix and logic. If the matrix matches the text, that particular condition is assigned to the call file.

For example, a categorization matrix for "laser hair removal" may include the words "unwanted hair," "waxing," "shaving," "hair removal," etc. If the text conversation includes one or more of these words, the system considers this categorization for the condition for the file when it has been compared to this matrix. For example, if a patient states "I have some unwanted hair on my upper lip, and waxing and shaving have not been helping, so I'd like to explore other options," and the staff responds "Okay. Are looking for laser treatment? Our Gmax product is great for that," this may be put into a first categorization of "laser hair removal" which may be triggered by keywords "unwanted hair," "waxing," and "shaving."

The categorization may be set up to trigger when one of the terms exists in the conversation or any number of the terms, or all of the terms may be required. For example the condition may be triggered if two or more of the terms appear in the conversation. Logic may also be applied, for example, including determining where in the syntax the word appears to govern whether the condition is triggered for the categorization. Relevancy strength may be considered when matching a conversation to a condition matrix.

Furthermore, many other matrices may exist. There may often be overlap between one or more matrices. Relevancies or priorities may be set up between different condition matrices. For example, if more terms of one matrix show up than another matrix, even though terms from both exist in the conversation, the system may create a preference for one over the other. The logic may be set up in any number of ways. Some matrices or terms in a matrix may have higher rankings for priority than others. For example, if the word "wax" shows up, it may indicate a higher chance that it is a laser hair removal than other treatments or conditions. It may also possibly indicate more than one treatment or condition.

In one exemplary implementation, the first condition categorization is considered important or necessary, so if there is no match (step 804), the call is flagged and sent to a human screener (step 806). If the relevancy threshold is met (step 804), the condition or treatment category, e.g., laser hair removal, is assigned to the file (step 808) and the process moves to the next attribute.

Next, based on the first categorization, a second-tier categorization assignment may occur by comparing the text to a second tier of matrices (step 810). In this case, the second tier identifies the physical area of the condition or treatment. For example, given the previous example conversation transcription, the system determines that the second categorization is "facial hair" due to the matching of the text to a matrix including key words such as "upper lip," "eyebrows," "chin," "cheek," etc. Different first categorization conditions have different second-tier categorization matrices associated with them. For example, "laser hair removal" may have different physical areas associated with it than "stretch marks" would. That is, different physical areas each have their own matrices, e.g., one for facial hair, one for leg hair, etc. If the physical area category is present (step 812), the second categorization is applied to the file, e.g., "upper lip," "facial hair" (step 814). If it is not present, the system may move to the next categorization comparison in the process without assigning an additional physical area categorization to the file.

The system then identifies a third categorization, in this case, any specific or trademarked medical devices, products, or prescriptions by comparing the transcribed text to matrices with known names, aliases, slang, or references (step 816). It compares the text to a particular product matrix and then assigns the corresponding attribute to the file. Preference to assigning the value is given to devices, products or prescriptions that fall within the previously assigned condition or treatment categories above. For example, from the previous example discussion transcription, the third categorization may be "Gentlemax by Candela" which may be triggered by various keywords such as "Gentle Max," "GeeMax," "Gmax," "Candela Gentlemax," etc. If a specific product or prescription is present (step 818), the third categorization assignment, e.g., Gentlemax by Candela, is applied to the file (step 820).

Although described with respect to dermatology and plastic surgery, this process is applicable to other industries. Depending on the industry, environment or purpose in which the process is used, any number of suitable categorizations may be used and applied to any aspects that are appropriate. Similar to above, the categorizations may be performed by matching the transcribed file with lists of keywords, or other logical conditions that may determine whether the discussion is appropriate for that particular categorization. These conditions and categorizations may be used and adapted to other industries and aspects. For example, instead of a condition of a patient, the system may determine a product sold, such as a television, or any other suitable feature or aspect of the business.

FIG. 9 depicts an exemplary screen shot 902 showing an example of a report that may be generated based on information collected from the above-mentioned processes. Users, e.g., doctors, may access this screen by accessing the call analysis server 108 over the internet 112. The assignments of the call outcomes, conditions and categorizations may be used to create the reports. Any variations of this information may be used. The call analysis server may access the call file to retrieve assigned outcomes, conditions, treatments, names and other information for reporting. The screen shot 902 may be accessed by a user accessing the call analysis server 108 over the Internet 122. As can be seen from the Figure, various useful data may be easily determined through the analysis of the call monitoring process.

For example, through collection of above-mentioned data, the call analysis server 108 may determine and display summary information 804 such as the total number of calls that came in, the number of booked appointments, an average booking rate, the national average booking rate, and the deviation from the national average. In addition, it may also display the number of existing patients and the average call duration.

As also shown, the screen shot 802 may also display a breakdown of the conditions and treatments 806 about which callers were calling, by percentage, for example. Furthermore, it may display the call outcome breakdown 808, showing how many calls booked an appointment, were existing patients, hung up while on hold, left a message, spoke to the answering service or asked for additional information. It may also display the call-level details 810 on each individual call, for example, showing the date, duration, call outcome, condition or treatment, and the staff member that answered the call. The reports may also detail statistics for individual staff members. The system may produce these reports in any format, such as a graph of an average booking rate by month 812, and any other additional information may be included.

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A computer-implemented method in a data processing system for automatically determining an outcome of a phone call, comprising;
   receiving voice data of a phone call;
   automatically analyzing the received voice data by parsing words on the phone call of two or more participants;
   running the analysis of the received voice data through two or more sequential tests until the outcome of the call is determined, wherein an initial test of the sequential tests determines the sequential tests used after the initial test, and wherein each test is configured to determine a potential outcome and includes one or more of:
   (1) searching the parsed words for one or more key words,
   (2) searching the parsed words for a combination of keywords,
   (3) searching the parsed words for a combination of keywords in a predetermined order,
   (4) searching the parsed words for a phrase,
   (5) searching the parsed words for a combination of phrases,
   (6) searching the parsed words for a plurality of phrases in a predetermined order,
   (7) searching the parsed words for a reply to a phrase,
   (8) searching the parsed words for a reply to a reply to a phrase,
   (9) searching the received voice data for satisfaction of a logic condition, and
   (10) searching the received voice data for an indicator not based on key word matching, and
   (11) any combination of (1)-(10); and
   automatically determining the outcome of the phone call based on a result of the two or more sequential tests run on the analysis of the received voice data.

2. The method of claim 1, further comprising:
   receiving the phone call from a caller;
   recording the phone call; and
   creating voice data from the recording of the phone call.

3. The method of claim 2, wherein the phone call is received by a medical office and the caller is one of: (1) a patient of the medical office, and (2) a potential patient of the medical office.

4. The method of claim 2, further comprising assigning the call to a human screener.

5. The method of claim 2, further comprising:
   automatically determining one of: (1) a name of the caller, (2) a date and (3) a name of a staff member who answered the phone call.

6. The method of claim 1, wherein the outcome comprises one of: (1) the caller left a message, (2) the caller hung up while on hold, (3) the caller is an existing client, (4) the caller booked an appointment, (5) the caller was connected to an answering service, (6) the caller asked for information, (7) the caller asked to reschedule an appointment, (8) the caller asked about a consultation fee.

7. The method of claim 1, wherein the outcome comprises one of: (1) the caller booked an appointment, and (2) the caller did not book an appointment.

8. The method of claim 1, wherein the outcome comprises one of: (1) the caller purchased a product, and (2) the caller did not purchase a product.

9. The method of claim 1, further comprising: automatically determining a condition discussed during the phone call.

10. The method of claim 9, wherein determining the condition further comprises: automatically assigning one or more categorizations to the voice data indicating one or more conditions.

11. The method of claim 10, wherein the condition is a medical condition.

12. The method of claim 1, further comprising: automatically determining a subject matter of the call.

13. The method of claim 1, further comprising: automatically determining whether a caller's question was answered.

14. The method of claim 1, further comprising: automatically determining whether the caller is satisfied with the result of the call.

15. The method of claim 1, further comprising: automatically determining whether a particular product is discussed on the call.

16. The method of claim 1, automatically determining whether a particular service is discussed on the call.

17. The method of claim 1, wherein an initial test is determined by one of: (1) the first three sentences of the phone call, and (2) the first 15 seconds of the phone call.

18. The method of claim 1, wherein automatically determining the outcome of the phone call based on the analysis of the received voice data occurs after the phone call has ended.

19. A data processing system for automatically determining an outcome of a phone call, comprising;
    a memory configured to store instructions to cause a processor to:
    receive voice data of a phone call;
    analyze the received voice data by parsing words on the phone call of two or more participants;
    run the analysis of the received voice data through two or more sequential tests until the outcome of the call is determined, wherein an initial test of the sequential tests determines the sequential tests used after the initial test, and wherein each test is configured to determine a potential outcome and includes one or more of:
    (1) searching the parsed words for one or more key words,
    (2) searching the parsed words for a combination of keywords,
    (3) searching the parsed words for a combination of keywords in a predetermined order,
    (4) searching the parsed words for a phrase,
    (5) searching the parsed words for a combination of phrases,
    (6) searching the parsed words for a plurality of phrases in a predetermined order,
    (7) searching the parsed words for a reply to a phrase, (8) searching the parsed words for a reply to a reply to a phrase,
(9) searching the received voice data for satisfaction of a logic condition, and
(10) searching the received voice data for an indicator not based on key word matching, and
(11) any combination of (1)-(10); and determine the outcome of the phone call based on a result of the two or more sequential tests run on the analysis of the received voice data; and the processor configured to execute the instructions.

20. The data processing system of claim 19, wherein the instructions further comprise:
receiving the phone call from a caller;
recording the phone call; and
creating voice data from the recording of the phone call.

21. The data processing system of claim 20, wherein the phone call is received by a medical office and the caller is one of: (1) a patient of the medical office, and (2) a potential patient of the medical office.

22. The data processing system of claim 20, wherein the instructions further comprise assigning the call to a human screener.

23. The data processing system of claim 20, wherein the instructions further comprise automatically determining one of: (1) a name of the caller, (2) a date and (3) a name of a staff member who answered the phone call.

24. The data processing system of claim 19, wherein the outcome comprises one of: (1) the caller left a message, (2) the caller hung up while on hold, (3) the caller is an existing client, (4) the caller booked an appointment, (5) the caller was connected to an answering service, (6) the caller asked for information, (7) the caller asked to reschedule an appointment, and (8) the caller asked about a consultation fee.

25. The data processing system of claim 19, wherein the outcome comprises one of: (1) the caller booked an appointment, and (2) the caller did not book an appointment.

26. The data processing system of claim 19, wherein the outcome comprises one of: (1) the caller purchased a product, and (2) the caller did not purchase a product.

27. The data processing system of claim 19, wherein the instructions further comprise: automatically determining a condition discussed during the phone call.

28. The data processing system of claim 27, wherein determining the condition further comprises: automatically assigning one or more categorizations to the voice data indicating one or more conditions.

29. The data processing system of claim 28, wherein the condition is a medical condition.

30. The data processing system of 19, wherein the instructions further comprise: automatically determining a subject matter of the call.

31. The data processing system of claim 19, wherein the instructions further comprise: automatically determining whether a caller's question was answered.

32. The data processing system of claim 19, wherein the instructions further comprise: automatically determining whether the caller is satisfied with the result of the call.

33. The data processing system of claim 19, wherein the instructions further comprise: automatically determining whether a particular product is discussed on the call.

34. The data processing system of claim 19, wherein the instructions further comprise automatically determining whether a particular service is discussed on the call.

35. The method of claim 19, wherein an the initial test of the two or more sequential tests is determined by one of: (1) a first three sentences of the phone call, and (2) a first 15 seconds of the phone call.

* * * * *